United States Patent [19]

Cohen et al.

[11] Patent Number: 4,525,830
[45] Date of Patent: Jun. 25, 1985

[54] ADVANCED NETWORK PROCESSOR

[75] Inventors: Albert E. Cohen, Merrick; William G. Hance, Selden; Ian Moir, Stony Brook, all of N.Y.; Thao Lane; Frederic Caussarieu, both of Rennes, France

[73] Assignees: Databit, Inc., N.Y.; Ouest Standard Telematique, France

[21] Appl. No.: 545,030

[22] Filed: Oct. 25, 1983

[51] Int. Cl.³ .................... H04Q 11/04; H04Q 11/00
[52] U.S. Cl. ........................ 370/60; 370/56; 370/89; 370/94
[58] Field of Search ............. 370/94, 60, 56, 89, 370/67

[56] References Cited

U.S. PATENT DOCUMENTS

| Re. 31,182 | 3/1983 | Crager et al. | 370/60 |
|---|---|---|---|
| 3,979,733 | 9/1976 | Fraser | 370/60 |
| 4,335,456 | 6/1982 | Gaiser et al. | 370/60 |
| 4,354,263 | 10/1982 | Bordry et al. | 370/60 |
| 4,408,323 | 10/1983 | Montgomery | 370/60 |
| 4,423,507 | 12/1983 | Roger et al. | 370/89 |
| 4,445,214 | 4/1984 | Reynolds et al. | 370/94 |
| 4,446,555 | 5/1984 | Devault et al. | 370/94 |

Primary Examiner—Douglas W. Olms
Assistant Examiner—Curtis Kuntz
Attorney, Agent, or Firm—Thomas H. Jackson

[57] ABSTRACT

An advanced network processor or concentrator which uses distributed processing to interface a plurality of subscriber data input lines to a packet network. The concentrator includes removable line terminators boards (ULT) which can be configured to handle a variety of signal characteristics. Each ULT interfaces to a line director unit (LDU). The line director units process and packetize the data. All the LDU's are interfaced to each other over a high speed data bus which is also accessible by a nodal director unit (NDU). Each LDU is programmed by the NDU to recognize and process the data at each subscriber line and instructed by the NDU to down load it's processed data to a selected trunk line director unit (TLDU). The TLDU transmits the data over a trunk line to a packet switching network. The system is modular, expandable and reprogrammable to handle differently typed subscriber inputs as necessary.

23 Claims, 8 Drawing Figures

NDU BLOCK DIAGRAM

BLOCK DIAGRAM OF LDU BOARD

BLOCK DIAGRAM OF UNIVERSAL LINE TERMINATOR

BLOCK DIAGRAM OF LDE BOARD

SYSTEM BLOCK DIAGRAM

ADVANCED NETWORK PROCESSOR

BACKGROUND OF THE INVENTION

The present invention is related to an advanced network processor (ANP) which serves as a concentrator in data communication systems, in particular, to a processor which receives data from many subscriber lines, packages and formats the data and retransmits the data via trunk lines which lead to packet switching networks for communication and transmission to other subscribers or terminals.

In the past, when telephonic and telex communications was most important, interconnection between various subscribers was simple. It involved the direct routing of subscriber lines to local central switching exchanges from where the calls or telex data was transferred across great distances to other central switching stations and redirected to a desired subscriber. Interconnection was simple because all calls or data orignated from devices with similar characteristics. It was either a telephone or perhaps a telex machine. Carriers and interconnect companies employ large machines which receive information from many subscriber lines and combine them for transmission over great distances by using techniques such as time division multiplexing (TDM) or other suitable means for transmission.

With the recent explosive penetration of the computer and data terminal into the home and the office, a need for transmission and exchange of data between these devices has arisen. Accordingly, data is being transferred from one subscriber to another through the facilities of carriers and interconnect companies. Data subscribers can call and receive large quantities of data which originate from special data base facilities many of which provide their own transmission and interconnection networks.

Since the data subscribers employ various machines of different data transmission characteristics, carriers, interconnect companies and data base providers are required to provide facilities which can accomodate the various data terminals. Consequently, carriers and interconnect companies provide dedicated hardware which is capable of interfacing and understanding the protocol of each specific machine for which a line is provided. If the device which is at the end of a subscriber line is changed, it is necessary to physically alter and exchange hardware which is associated with a specific subscriber line in order to accomodate a differently typed subscriber. Furthermore, the present day facilities are such that great investments of money and time are required in order to increase the capacity of a given facility. Present day network processors or concentrators, as they are known, are very large machines which accomodate a large number of subscribers and which are quite expensive. Since these machines must be dedicated and taylored for particular subscribers, planning for future growth is hampered due to uncertainty as to the type and nature of data communication equipment which will eventually be connected to the network. In sum, these machines are not modular and consequently cannot grow with a growing market of subscribers. They are inflexible and can not be easily retrofitted to handle various data types or a mixture thereof in accordance with marketing requirements.

SUMMARY OF THE INVENTION

It is an object of the present invention to provide an advanced network processor or a concentrator with programmable subscriber input ports which may be easily and quickly modified through simple software and minor hardware adjustment to accomodate differently typed data formats.

It is another object of the invention to provide an advanced network processor which is modular in construction both internally and externally.

Still another object of the invention is to provide an advanced network processor which is constructed of a combination of a few circuit boards in order to improve logistics by facilitating stocking of parts requirements.

Still another object of the invention is to provide an advanced network processor which accomodates an intermediate number of subscriber lines and which is inexpensive so that a gradual expansion of a subscriber base is readily accomodated.

It is still a further object of the invention to provide an advanced network processor which is microprocesserized and primarily software driven in order to allow rapid changes and improvements to service future data protocol enhancements and to provide increased capability and features.

To achieve the stated objectives, there is provided in one embodiment, an advanced network processor (ANP) for data transmission and communication which uses distributed processing, in which there are provided a plurality of line director units (LDU). Each one of the LDU's includes a plurality of subscriber circuits which accomodate line terminated input lines. These subscriber circuits are programmable to handle a selected protocol from a plurality of subscriber data protocols. The line terminated input lines are generated by a plurality of universal line terminators (ULT) which are used for interfacing actual subscriber input lines to the subscriber circuits which are resident on the LDU's. The ULT's are configured to accept the signal levels which are provided through the various subscriber input lines and to condition them to a signal type which is acceptable by the previously mentioned subscriber circuits which are resident on each LDU. Each LDU is programmable to accept the signals and understand the protocol used by each subscriber line. Furthermore, the LDU compiles the data received from the many subscriber input lines and arranges them into data packets which are stored in a memory which is resident on each LDU. The LDU may be provided with a output trunk line over which the data packets may be transmitted to a transmission network or to a packet switching network. Alternatively, data packets for one LDU may be transmitted to the memory of another LDU over a system bus interconnecting all the LDU's so that the other LDU may be used for the actual transmission of the data packets to the transmission network.

The data protocols which may be used by the ANP may include an asynchronous, a bi-synchronous or an CCITT X.25 data format and protocol.

In a further embodiment of the invention, there is featured a nodal director unit (NDU). The NDU is a supervisory circuit for coordinating data flow between the LDU's and for providing an interface to an operator or to a network management center (NMC). The NMC is ordinarily a computer which controls and is part of a packet network system. The nodal director unit may be a microprocesserized board with its own memory and it may include RS232 and printer ports or other terminal type ports. The nodal director units and the line director unit are interfaced over a system bus over which both data signals and control signals are routed. The NDU directs and informs each LDU as to the type and nature and format of subscriber inputs lines which it will handle in each of its subscriber circuits. Additionally, it also is used as previously mentioned for supervisory and control functions.

In order to accomodate an increased number of subscriber circuits a further embodiment of the invention provides for the inclusion of line director extender (LDE) circuit. Line director extender (LDE) circuits may be connected to one LDU and serve to increase the number of subscriber input lines handled by a single LDU. Each LDE opperates in conjunction with a universal line terminator board to interface the actual subscriber inputs lines to a given LDU.

The construction of the ANP is modular and allows for increased growth to accomodate a gradually increasing subscriber or user base. That is, as the number of subscribers increases, capacity is increased by providing additional LDU and LDE circuit boards or by providing additional ANP's which may be interconnected to provide an overall larger system. Where necessary, there is provided, in a preferred embodiment, an alarm circuit and extender (ACE) board for performing monitoring functions and for increasing the number of subscriber input lines which may be handled by an ANP. This is accomplished by extending the system bus over which the NDU and the LDU's communicate to external equipment. The extended system bus may be used to allow additional LDU's which may be physically resident in another ANP configuration to communicate to a master ANP. A selected number of LDU's may be provided with direct memory access (DMA) capability to further speed the data traffic along the system bus.

To protect against failures and to increase circuit reliability, there is provided a watchdog circuit which monitors the clock circuits and other functions to ensure their continued functionality. The watchdog circuit informs the NDU and the ACE circuit of detected malfunctions. To protect against loss of data due to power interruptions, the ANP is provided with a CMOS RAM memory which is battery backed. To further increase reliability, an improved ANP is provided with a second nodal director unit which serves to provide the ANP with redundancy capability and which goes into operation in the event of a failure associated with the first NDU. The ANP is also provided in most configurations with both on line self test and monitoring functions and with off line diagnostic software and hardware to isolate and localize circuit faults and to report these faults to an operator.

To effect the extensive interconnections which are required between the boards and to maintain a rather compact and small package for the ANP, a two sided mother board is provided which has connectors mounted on both of it sides. Selected pins of the connectors may be connected to wire traces of the mother board to realize a bus type structure by allowing interconnection of common lines. Other pins of the connectors are fed through the mother board. Thus, signal boards inserted in oppositely located connectors may be routed directly from one board to another without routing at the same time, these signals to other boards in the system. Thus, a ULT may be inserted directly opposite a respective LDU to allow subscriber input lines to be directly routed to subscriber circuits which are resident on an LDU.

Thus it has been shown that the invention succeeds in providing a very compact, efficient, reprogrammable and growth oriented processor for receiving and accomodating various subscriber input data and for processing the data and retransmitting the data over high through put and sophisticated data transmission networks or data packet switching networks.

Other features and advantages of the invention will be apparent from the following description of the preferred embodiment, and from the claims.

For a full understanding of the present invention, reference should now be made to the following detailed description of the preferred embodiment of the invention and to the accompanying drawings.

DETAILED DESCRIPTION OF THE PREFERRED EMBODIMENT

A preferred embodiment of the invention will now be described with reference to FIGS. 1 to 8 of the drawings.

Figure 1:
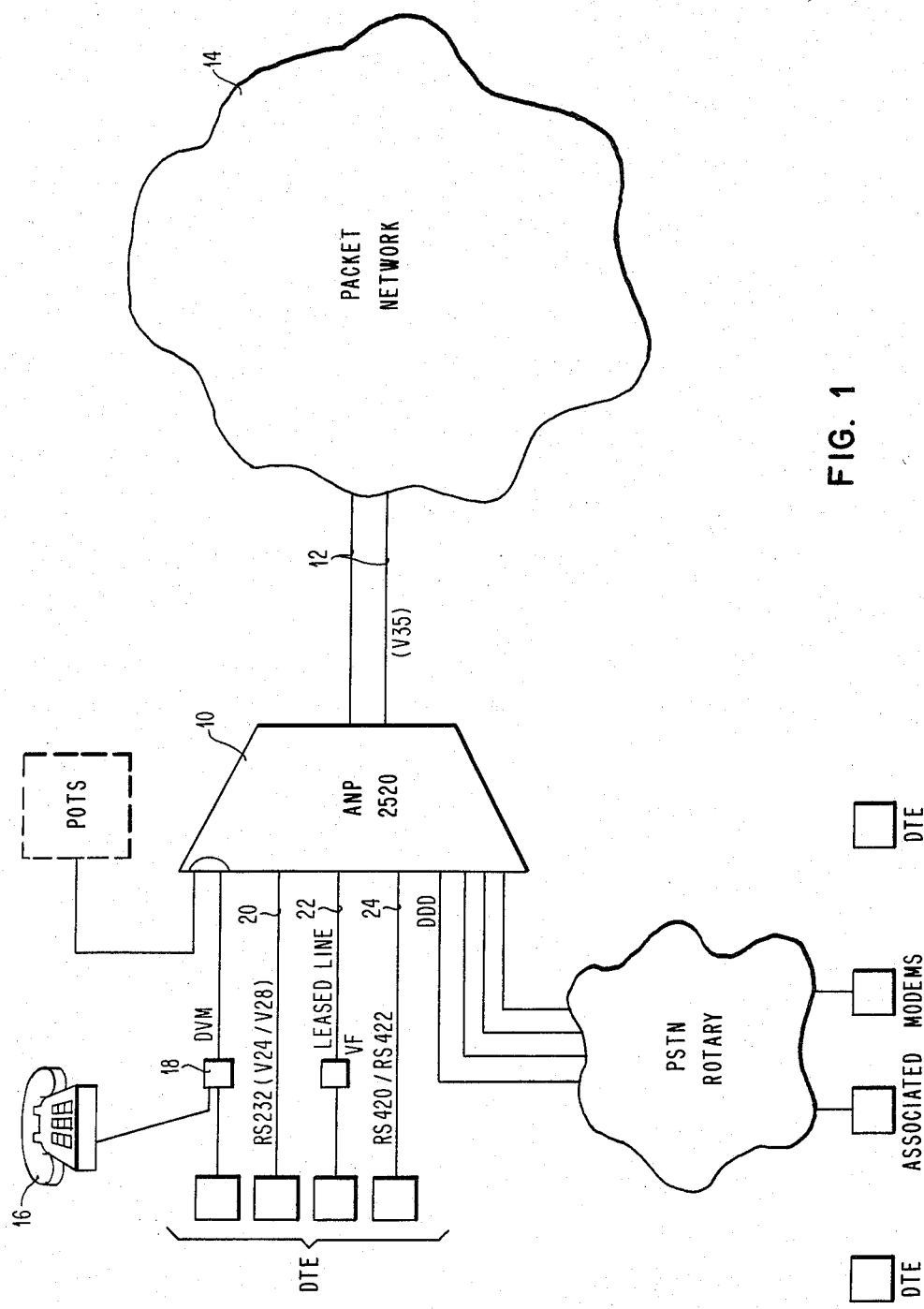
FIG. 1 shows an ANP, with its subscriber input lines and an associated packet switching network.

Referring to FIG. 1, an advanced network processor 10 is shown which receives data from subscribers and retransmits the data after its reformatting over fast trunk lines 12 to a packet network 14. The advanced network processor (ANP) 10 is a network concentrator which interconnects as many as 128 packet-mode and non-packet mode subscribers to packet switching networks through high speed trunks 12.

As shown in FIG. 1, subscriber lines may originate from variously typed equipment. They may comprise a telephone 16, which is interfaced to the advance network processor 10 through a digital voice modulator 18, or an RS232 (V24/V28) line 20, a leased line 22 or an RS429/RS422 line 24. However, the present ANP is not restricted to the data formats and protocols enumerated above and may include fast data inputs such as are generated in accordance with CCITT X.25 protocols in combination with slower data subscribers of the type listed above.

Traditional network concentrators or network processors include dedicated, nonmodular and inflexible circuits to accommodate each particular type of signal. Accordingly, in order to accomodate changing subscriber needs a large investment in new equipment or an extensive modification is required.

Figure 2:
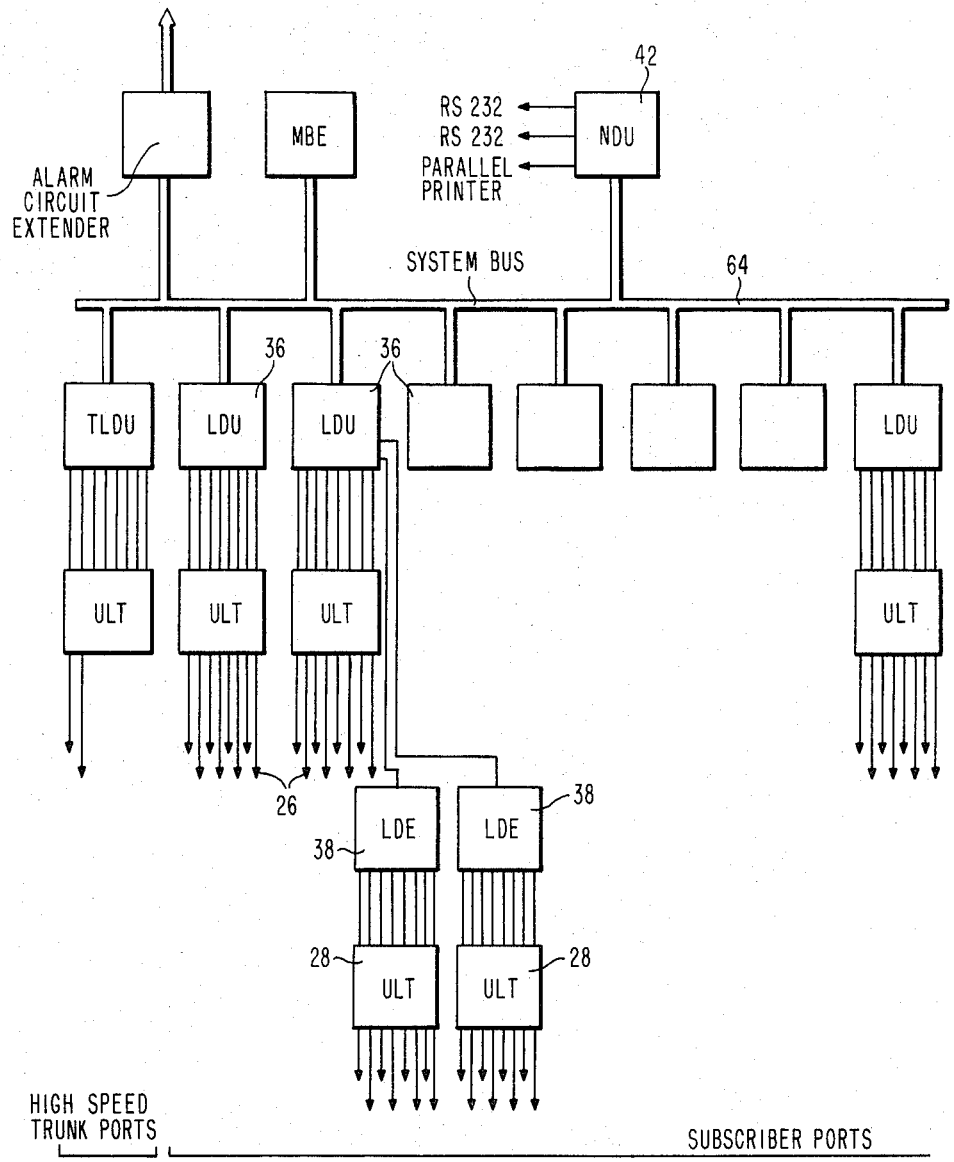
FIG. 2 is a system block diagram showing the NDU and the plurality of LDU's, ULT's and LDE's in a typical system.

In accordance with a preferred embodiment, a system block diagram of which is provided in FIG. 2 of the drawings, a flexible, modular and expandable network concentrator is provided which uses distributed processing to provide an inherent growth capability and modularity as shown. Each subscriber input line 26 represents a set of signals which is identified with one subscriber. A subscriber input line enters the ANP and is interfaced through a universal line terminator (ULT) 28. The function of a ULT is to receive the subscriber input and condition it to a signal level which is acceptable by the other circuits of the advanced network processor. In a preferred embodiment, the universal line terminator 28 is configured to allow up to eight lines per each subscriber input and includes jumper options 30 (FIG. 5) to allow field reconfiguration of the ULT 28. A typical ULT may include an RS422 or V35 interface 32, a PIA 34 for interfacing to an LDU 36 or other interface circuits.

Figure 4:
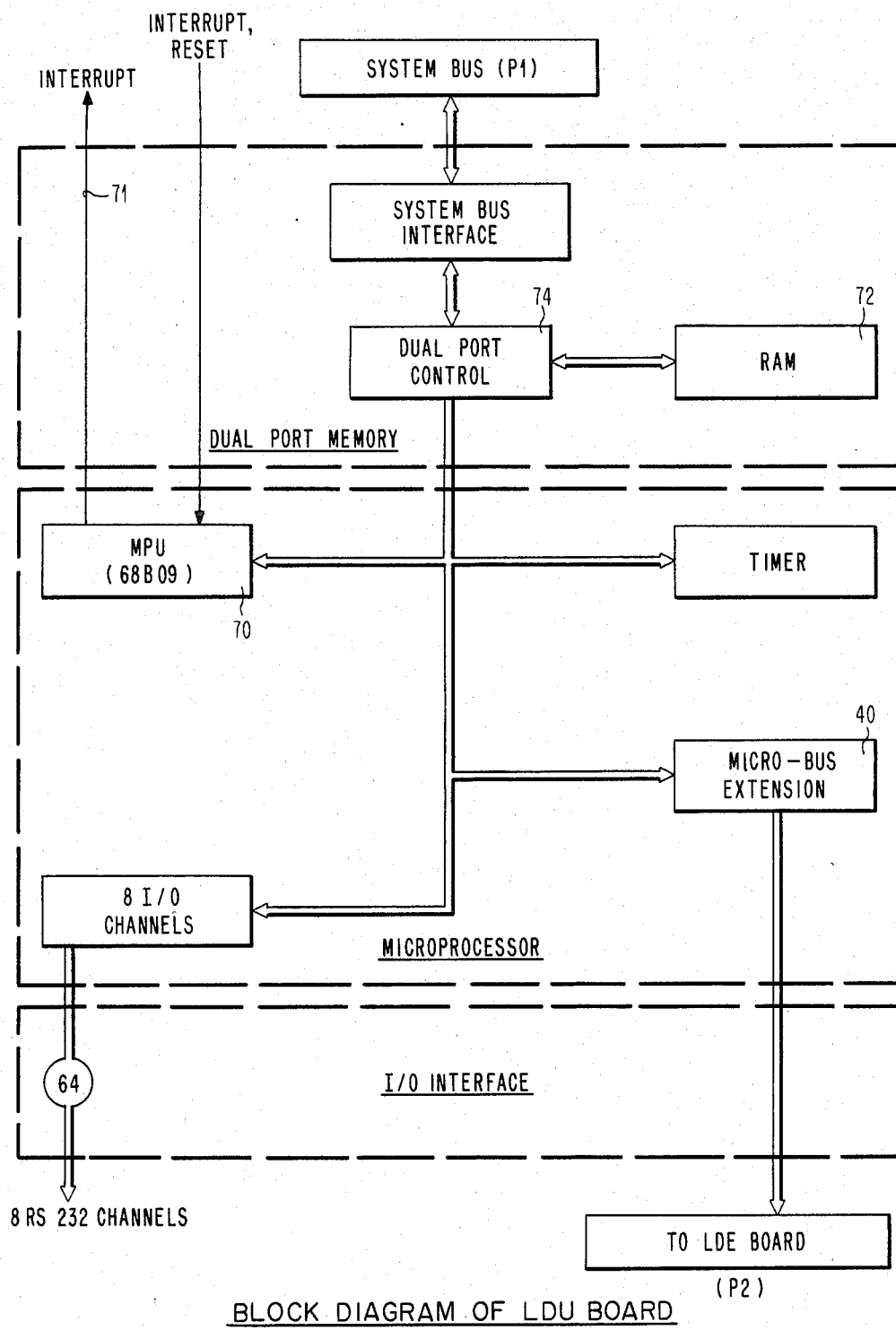
FIG. 4 is a block diagram of a line director unit (LDU).
Figure 5:
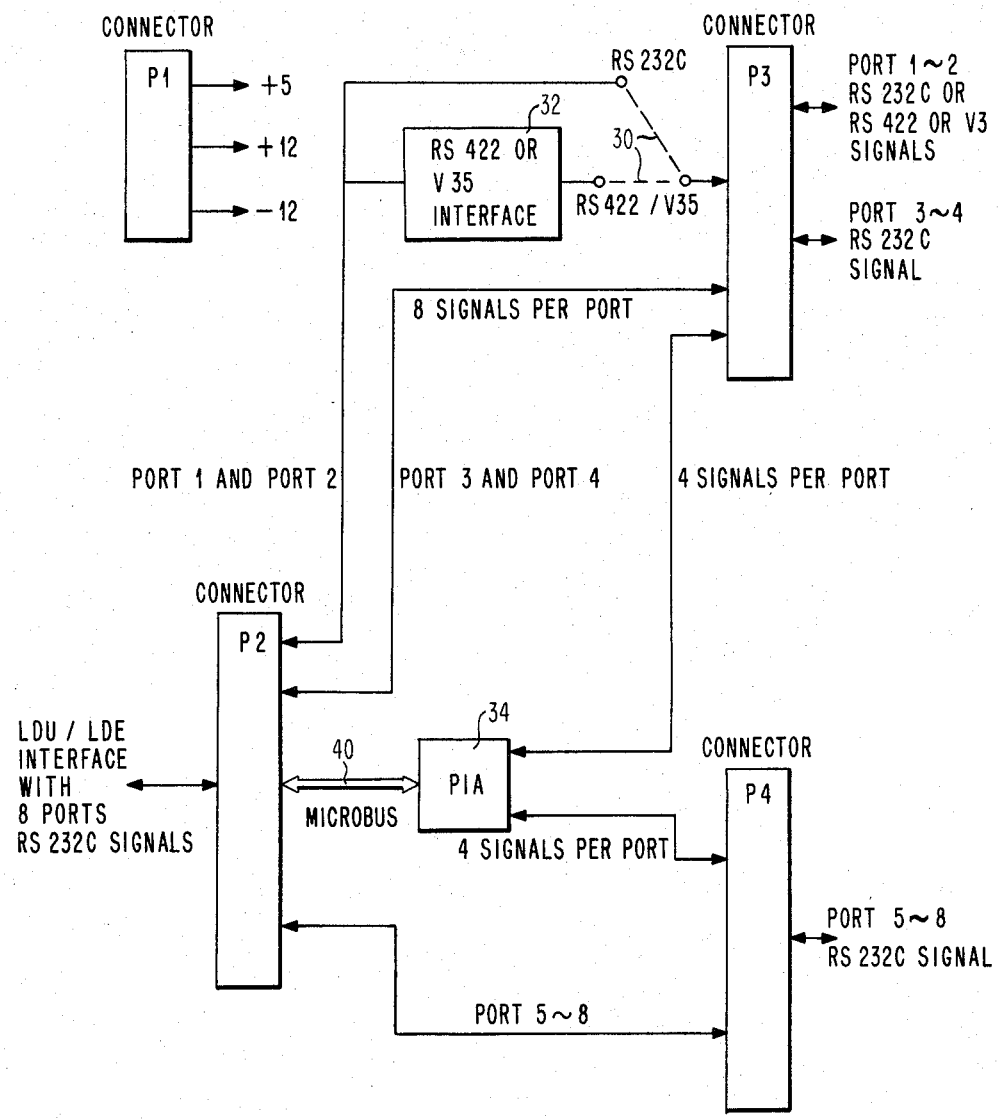
FIG. 5 is a block diagram of a universal line terminator (ULT).

Signals from the ULT 28 are routed to a line director unit (LDU) 36. Each ULT 28 has associated with it one line director unit 36. It is in the LDU 36 where all the processing, data formating and packaging is performed. Each LDU 36 can also support up to two line director expanders (LDE) 38. The LDE 38 is a cost effective circuit board designed for low traffic subscribers ports (example: eight lines at 1200 bits/s) and it interconnects to its respective LDU via a local bus 40 as shown in FIG. 4. Consequently, where a greater low traffic subscriber base is to be accomodated or contemplated a cost savings may be realized by reducing the number of LDU 36 boards and increasing the number of LDE 38 boards without loss of capability.

The heart of the ANP system 10 is the nodal director unit (NDU) 42 and its addressable bus which allows it to communicate with the LDU's 36 and other hardware which will be described below. There is one NDU 42 per system with multiple LDU's 36. The NDU includes a parallel printer interface and an RS-232 interface, for software configuration management diagnostics and statistics reporting. The NDU is the system bus master.

Figure 3:
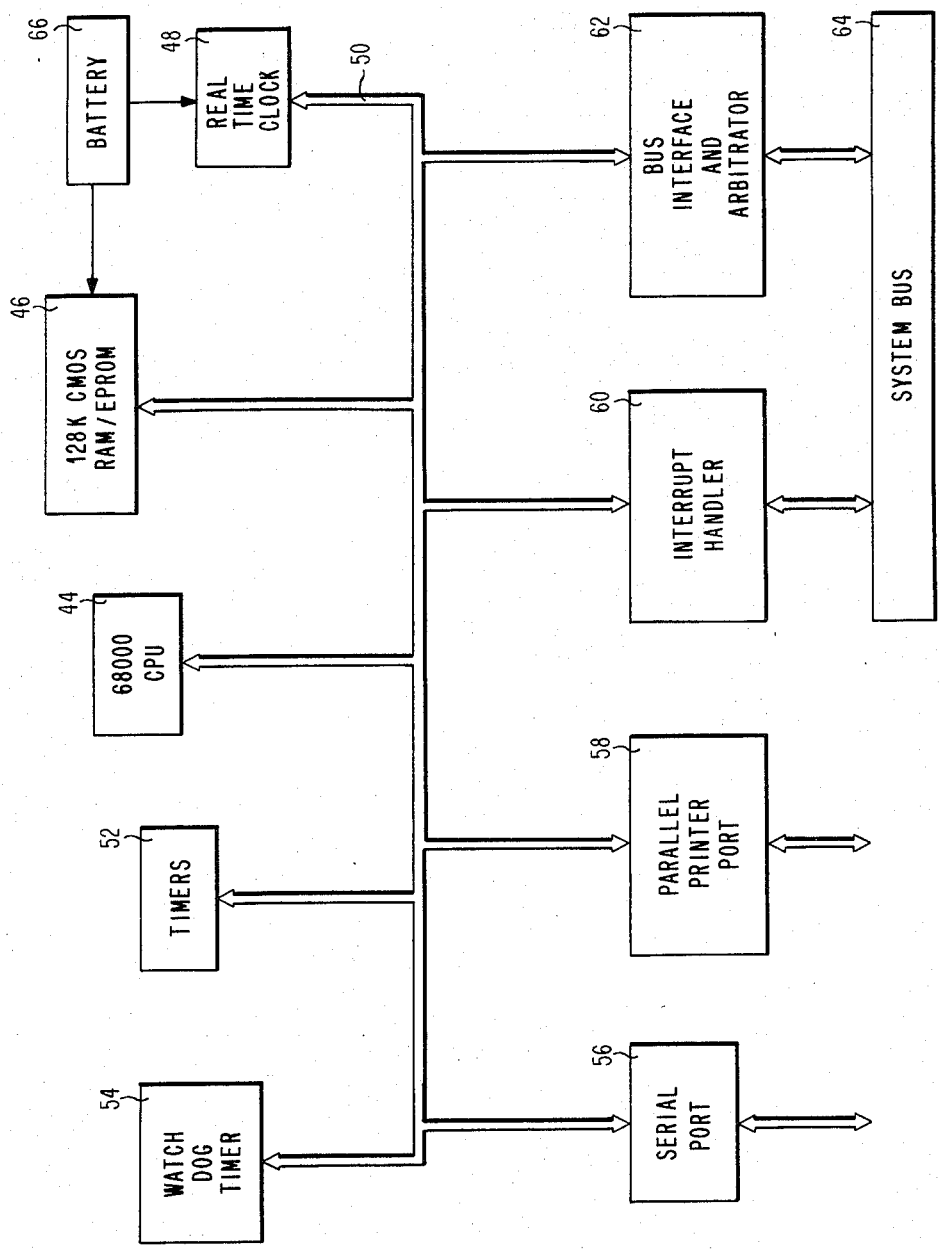
FIG. 3 is a block diagram of an nodal director unit (NDU).

The NDU comprises a self-contained printed circuit board with the following major blocks as shown in FIG. 3 of the drawings. The heart of the NDU circuit board is the 68000 Motorola microprocessor 44, which operates with 128K of CMOS RAM and EPROM memory 46. A real time clock 48 generator provides the required clock pulses to the microprocessor 44 which is a 16 bit external and 32 internal Motorola microprocessor which comprises a powerful computing and processing unit. The major circuit blocks of the NDU communicate over an NDU bus 50 as shown. The timers block 52, for example, incorporates several timing IC's which are programmable by the 68000 Motorola microprocessor 44 to provide time marks and elapsed time indications as required. The watchdog timer 54 operates in conjunction with the real time clock to provide external signals to indicate that a malfunction has been detected with the operation of the NDU board and to internally reset and restart the microprocessor in the event that certain prescribed and expected operations have not been performed within the span of a predetermined time. The serial port 56 and the parallel printer ports 58 are provided to allow the NDU board to communicate with external equipment for both data transfer in and out and for interfacing to an operator's terminal (not shown). The interrupt handler 60 block and the bus interface and arbitrator 62 block are provided to allow the NDU board to interface to the other circuit boards of the ANP 10 system over the system bus 64. The bus interface and arbitrator 62 circuit block includes the signals which allow the NDU 42 to transmit data to all the other circuit boards and to receive data therefrom and for generating the bus interface and arbitration signals which allow the NDU 42 microprocessor board to control the access to the system bus 64. While access to the system bus 64 may be allowed to the LDU's 36 and to various other circuits on a scheduled basis through a polling scheme which is included in the software of the NDU board, the interrupt handler 60 and the interrupt system included in the ANP 10 system allows a given processor from this family of processors which comprises this distributed processing ANP system to signal the NDU that access to the system bus is required. Finally, to ensure that data is not lost during temporary power outages and to ensure continuity of operation, a battery backup 66 is provided to the real time clock 48 and to the memory 46 as shown.

As stated earlier, the function of the LDU's 36 is to receive data from subscriber lines and reduce and package the data into data packets which are compatible with standards of a packet switching network 14. The function of the NDU 42 is to coordinate the activities of the LDU's 36 and to program the various LDU's prior to their operation in accordance with data inputs into the NDU which characterizes each subscriber line of the overall network. The bulk of data transfer takes place over the system bus 64. The subscriber data, once reduced, travels over the system bus 64 to an LDU which may be designated as a trunk line directory unit (TLDU) 68. The function of a TLDU 68, is to transmit the reduced and formatted data to a packet switching network or to a communication transmission network. A TLDU 68 is similar to an LDU 36 in all respects except that it is programmed to perform different functions. Consequently, an LDU 36 board may be configured and programmed to operate as a TLDU 68.

FIG. 4 is a block diagram of a typical LDU 36 board. The processing and computing unit comprises, in a preferred embodiment, a Motorola 68B09 MPU (microcomputer) 70. This microcomputer is efficient in that it incorporate internally the memory wherein the operational program is stored. As shown, interrupt and reset signals enter the microcomputer 70 block from the system bus and an interrupt line 71 is generated by the microcomputer to inform the NDU that servicing is required. External to the microcomputer 70 there is provided a RAM memory 72 with a dual port control 74. The function of the RAM memory 72 is to store subscriber data and for storing therein information from the NDU which provides the necessary data in order to format and reduce the data from the subscriber input lines. Through the dual port control 74 the RAM may be accessed by outside devices through the system bus so that the microcomputer may be bypassed for certain memory to memory data transfers. A timer 76 is provided which provides time indications and elasped time flags to the microcomputer 70. An LDU 36 board is provided with eight I/O channels 78 for communication with external devices which use RS-232 signal and data formats. Each of the I/O channels is provided with eight signals. If more signals per port or a different physical port interface is required, a ULT 28 will be coupled to the LDU or a similarly typed board. The ULT 28 allows for the following options:

(1) Provisions for thirteen signals per RS-232 port. All eight ports have this expansion capability.
(2) Conversion of two of the eight ports to RS-449/RS-422 standards. The remaining six ports will be left to RS-232.
(3) Conversion of two of the eight ports to V.35 standard. The remaining six ports will be left as RS-232.

Figure 6:
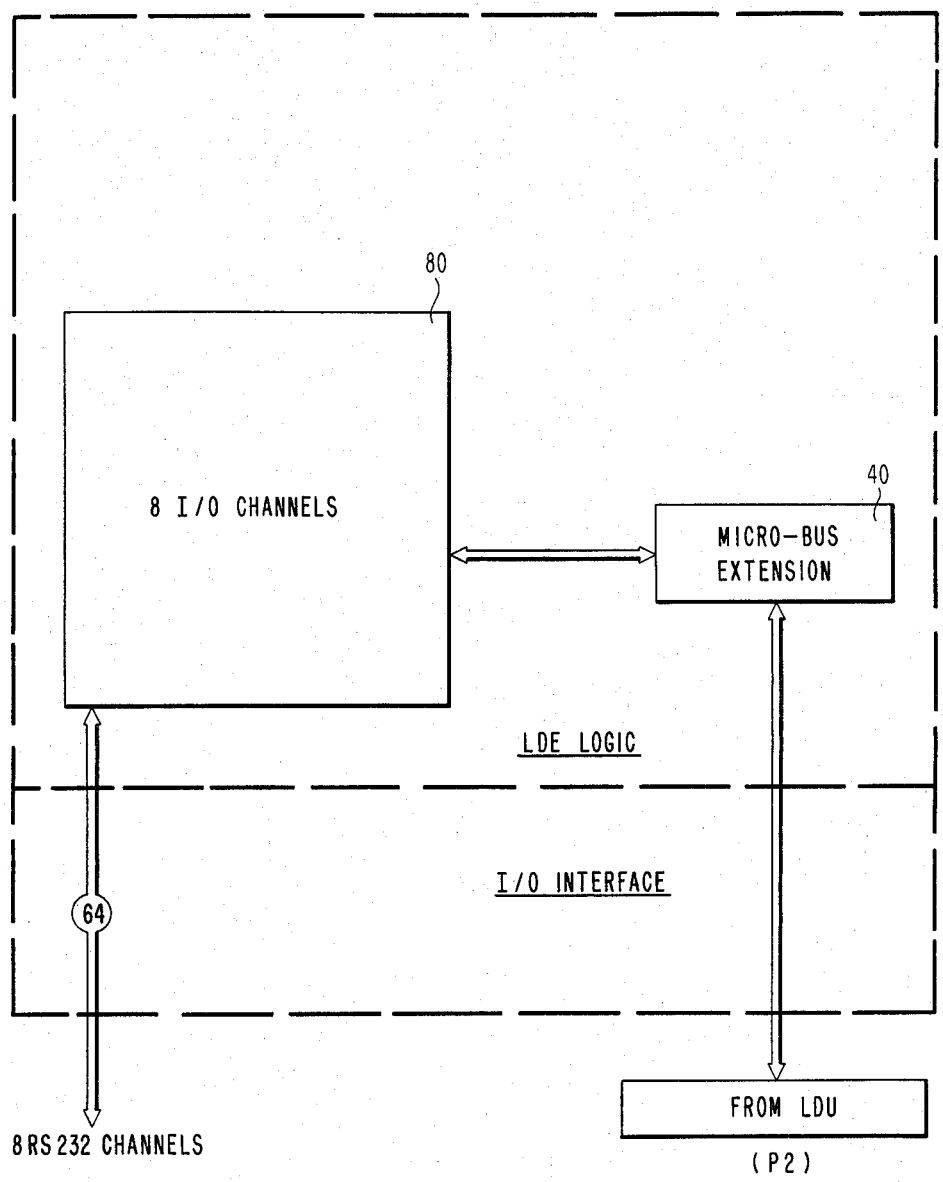
FIG. 6 is a block diagram of a line director extender board (LDE).

For users or entities which employ advanced network processors for a subscriber base with a comparitively low traffic data volume (for example, eight lines at 1200 bits per second or less) a cost effective option is available through the micro-bus extension 40 of the standard LDU 36 board. Through the micro bus extension the microcomputer 70 of the LDU 36 board internal bus may be interfaced to an LDE 38 board which contains and is populated by I/O channel hardware exclusively. Through this arrangement one microcomputer 68B09 processor can handle simultaneously 24 subscribers. Eight channels directly and 16 channels through two LDE 38 boards. A block diagram of a single LDE 38 board is shown in FIG. 6. Included therein are eight LDE I/O channels 80 which are controlled through a micro bus extension which arrives from a LDU 36 as shown.

Figure 7:
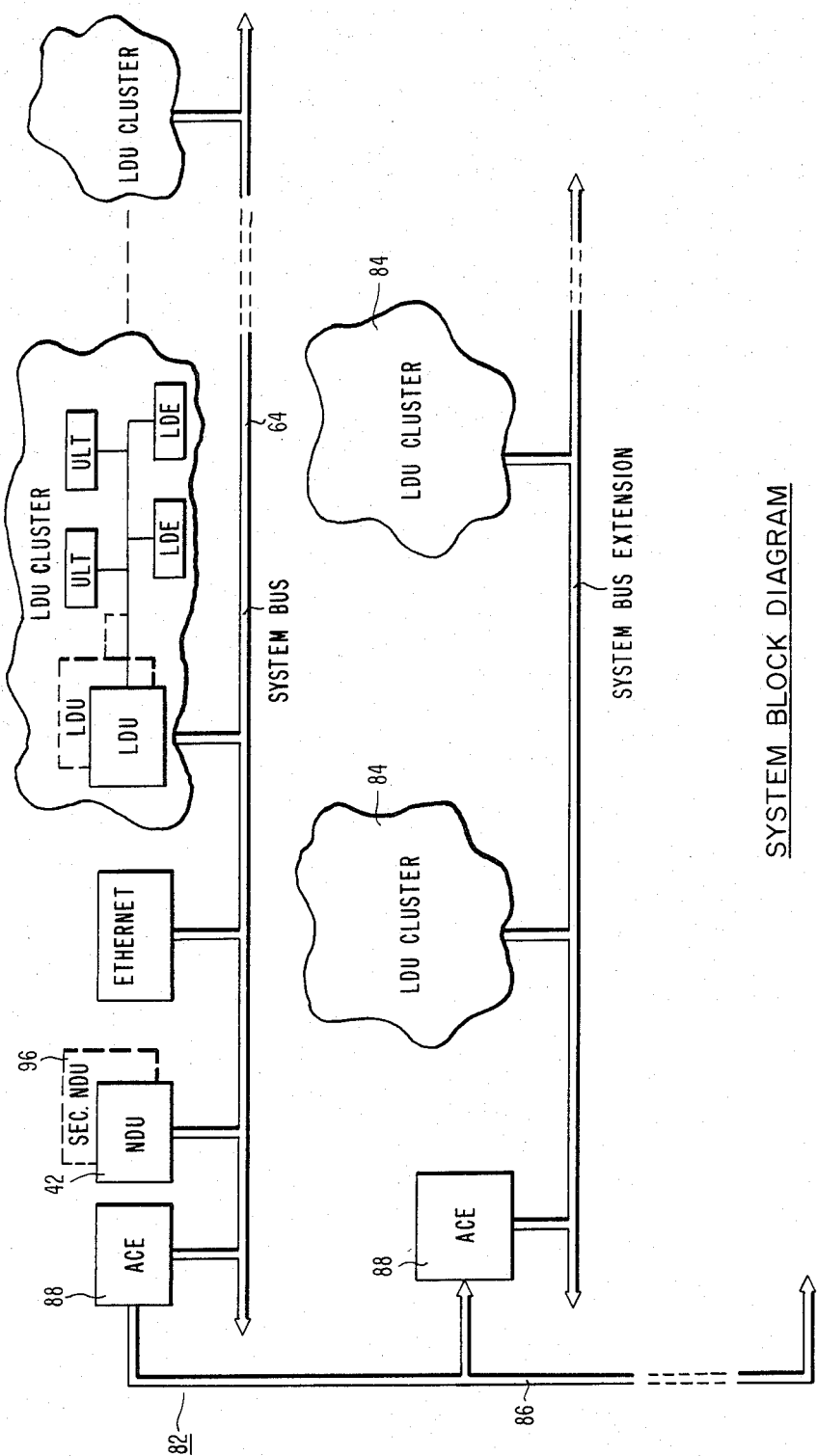
FIG. 7 shows a block diagram for a multi ANP system in which the control and extender (ACE) board is used for extending the system bus of the ANP.

An important advantage of the ANP 10 in accordance with the present invention is due to the modular construction of the system which employs very few standard parts which may be combined to realize a larger system. Firstly, the system is capable of accomodating a growing number of subscribers with the addition of LDU and/or LDE boards. Secondly, the system allows for a multi cage configuration in which additional LDU's and LDE's located in one card cage may be controlled by a single NDU which is located in another card cage. This is illustrated in FIG. 7 of the drawings in which an NDU 42 located in a first cage 82 is used for controlling several LDU clusters 84 located in another cage 86 with a system bus extension scheme. The alarm control and extender board 88 is used for buffering the system bus 64 from one cage to another as shown. The ACE board 88 also provides a centralized display and control facility as previously stated.

Figure 8:
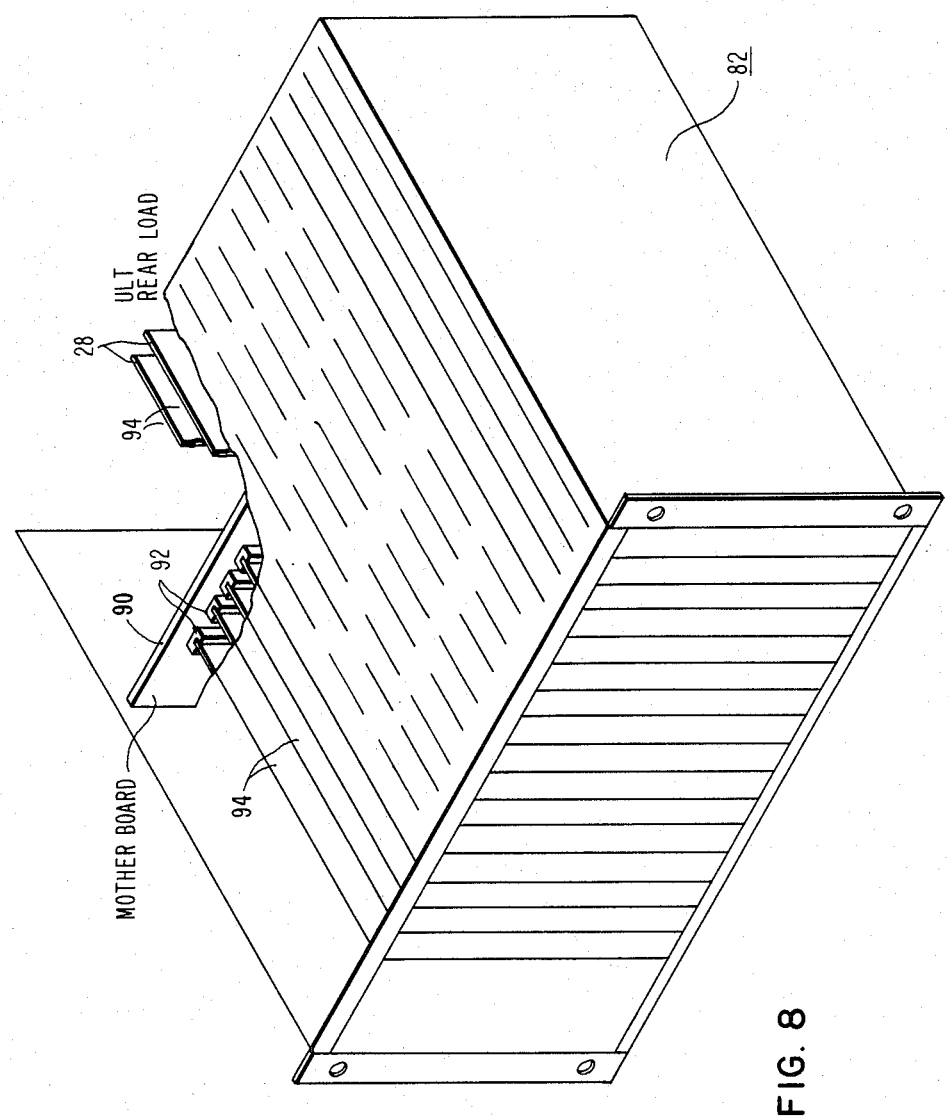
FIG. 8 shows a preferred embodiment for a card cage with a centrally located mother board.

The construction of a card cage for the ANP in accordance with a preferred embodiment of the invention, lends to the ANP a compact construction, eases the task of the wiring and interconnection of the several boards which comprise the system and increases its reliability. Consequently, as shown in FIG. 8 the card cage 82 includes a mother board 90 which contains traces interconnecting several boards and which is provided with the further benefit that connectors 92 are mounted on both sides of the mother board. The mother board is located centrally in the card cage 82 and allows circuit boards 94 to be inserted through openings located on either side of the mother board 90. Because certain of the pins in the connectors 92 are feed through pins which connect oppositely mounted connectors, ULT's 28 which directly interface with subscriber lines may be inserted on one side of the mother board and signals generated therein coupled directly, through short wires to a corresponding LDU 36 or an LDE as necessary. Thus, a great number of signals are directly coupled through the connectors to a given corresponding board while other signals as required may be wired to signals which run through the mother board to other circuit boards. A further advantage of the card cage is that it is designed to be mounted in a 19 inch standard rack.

External connectors to the ANP 10 are of the quick release type allowing for the pre-wiring of installation sites.

To gain the maximum benefit of a distributed processing environment, software is structured so that application tasks share resources from all processors. The LDU and other circuits buffer traffic and present it to the NDU 42 in an appropriate format. This is accomplished by a set of highly optimized processes resident within the LDU but administered by the NDU.

At system generation, these processes are incorporated in the NDU software and then are down loaded via the NDU 42 to the appropriate LDU.

The LDU is responsible for high level processes which incorporate system management, traffic routing, and data packetization. The interboard communication is accomplished via the system bus 64 previously described. This bus is a high speed bus which is capable of handling 8 mega bits per second.

There are two levels of diagnostics in the ANP 10. The first level provides continuous monitoring of unit hardware and isolation of the most probable faulty plug-in module. These are background tasks which do not interfere with normal system operation. The second consists of a wide range of software driven test routines to help identify faulty areas precisely. The second level of diagnostics consists of tests which are performed upon operator command.

Of particular importance is the ability of the ANP 10 to communicate with a network management center (NMC). A NMC is a computer or similar device, which comprises part of a packet switching network 14 and which may advantageously be used to control a multiplicity of ANP systems. Through such a data link, technical management, accounting management and alarms management may be provided. Thus subcriber management testing, network configuration management, software management, reporting management and measurement management may be controlled via a central location. For example, a network configuration management involves the ability to:

(a) force the closure/opening of subscriber or trunk lines.
(b) busy/unbusy subscriber or trunk lines (wait for all calls to be terminated on a given communication link and data to be forwarded on another communication link).

Software management involves measurements related to consistency, database examination, memory access and modification, memory dumps and dump line loads. Through this elaborate management scheme information about the status of lines, subscribers, trunks, billing periods, statistics, system configurations, and software status may be obtained. Furthermore, the software allows for a handshaking and data exchange which informs an ANP 10 about data packets sent or received and various information which informs the ANP as to the possibility of errors due to frames being too long, procedural errors, transparencies violations or sync and sequence errors.

The software accumulates information for each port which may be transmitted to the network management center upon request, which includes data about the total number of successful calls originated from each port. Other information which is available is the total number or reverse charge calls received and accepted by each board or total duration in seconds, of all originated calls and all reverse charge calls accepted by each port and total numbers of data packets untransmitted and received by each board excluding reverse charge calls originated. Additionally, other statistics related to each call may be provided. For example, the calling port identifier and called address or the duration of a call in seconds or the number of packets sent and received etc. may be provided.

The ANP 10 in a preferred embodiment is capable of accomodating a second NDU 96. The function of the second NDU 96 is to monitor the operation of the ANP and begin operation in the event that the failure of the first NDU is noted in order to allow continuous system operation.

There has thus been shown and described a novel apparatus for data communication which fulfills all the objects and advantages sought therefor. Many changes, modifications, variations and other uses and applications of the subject invention will, however, become apparent to those skilled in the art after considering this specification and the accompanying drawings which disclose preferred embodiment thereof. All such changes, modifications, variations and other uses and applications which do not depart from the spirit and scope of the invention are deemed to be covered by the invention which is limited only by the claims which follow.

What is claimed is:

1. An advanced network processor (ANP) which uses distributed processing and is connectable to a plurality of subscriber input lines for data transmission and communication in accordance with a plurality of subscriber data protocols, said processor comprising, in combination:
   (a) a plurality of line director units (LDU), each one of said LDU's including:
      (i) a plurality of subscriber circuits to accommodate line terminated input lines;
      (ii) a memory; and
      (iii) computing means, connected to said subscriber circuits and to said memory, for receiving data from said subscriber circuits, for arranging said data into data packets and for storing said data in said memory, said computing means being programmable to selectively accommodate a plurality of subscriber data protocols;
   (b) a plurality of universal line terminator (ULT) units, each one of said ULT's comprising means for interfacing said subscriber input lines and for providing said line terminated input lines to said subscriber circuits; each one of said ULT's being removably connectable to one of said plurality of LDU's so that each of said LDU's may be connected to a respective one of said ULT's which is configured to handle a selection of said subscriber input lines;
   (c) a system bus interconnecting said plurality of LDU's; and
   (d) a nodal director unit (NDU) for coordinating data flow between said plurality of LDU's and for performing supervisory functions; said data flow being routed along said system bus.

2. The ANP according to claim 1, wherein said plurality of LDU's and programmable to accomodate subscriber input lines which employ an asynchronous format.

3. The ANP according to claim 1, wherein said plurality of LDU's are programmable to accomodate subscriber input lines which employ a bi-synchronous format.

4. The ANP according to claim 1, wherein said plurality of LDU's are programmable to accomodate subscriber lines which employ an X.25 data format.

5. The ANP according to claim 1, further comprising at least one line director expander (LDE), said LDE being operative to be interfaced to one of said LDU's for expanding the number of said subscriber input lines which may be handled by said ANP.

6. The NDU as in claim 1, wherein said NDU is capable of communicating with a network management center (NMC) of a packet switching network.

7. The ANP as in claim 1, further comprising a terminal, said terminal being interfaced to said NDU to allow an operator to control, program and monitor the configuration of said plurality of LDU's and functions performed within said ANP.

8. The ANP as in claim 1, further comprising an alarm circuit and extender (ACE) for performing monitoring functions and for increasing the number of subscriber input lines which may be handled by said ANP.

9. The ANP as in claim 1, wherein at least one of said plurality of LDU's in configurable as a trunk line director unit (TLDU), said TLDU being operative for interfacing said ANP to a trunk line.

10. The ANP as in claim 9, wherein said trunk line is designed to interface to a packet switching network which uses a CCITT X.25 protocol.

11. The ANP as recited in claim 5, wherein said ANP can accomodate from 1 to 192 subscribers by controlling the number of said LDU's and said at least one LDE provided in said ANP.

12. The ANP according to claim 5, further comprising an alarm circuit and extender (ACE) and a slave card cage which is loadable with said LDU's, ULT's and LDE's to further increase the number of subscriber input lines which may be handled by said ANP; said ACE including means for extending said system bus to said slave card cage.

13. The ANP according to claim 12, wherein said ACE further comprises an alarm circuit said ACE serving to provide a centralized display and control facility.

14. The ANP according to claim 1, wherein said NDU further comprises a plurality of RS-232 ports and at least one printer port.

15. The ANP according to claim 5, wherein said NDU includes a 68000 Motorola type microprocessor.

16. The ANP according to claim 5, further comprising:
   (a) a watch dog circuit for detecting circuit malfunctions;
   (b) CMOS RAM memory; and
   (c) a battery backup circuit to maintain data of said CMOS RAM during power outages.

17. The ANP according to claim 1, further comprising a second NDU, said second NDU serving to provide said ANP with a redundancy capability and operating to ensure continued operation in the event of a failure associated with said NDU.

18. The ANP according to claim 1, wherein said ANP is capable of self monitoring during operation to ensure continued system operation.

19. The ANP according to claim 18, wherein said ANP is provided with internal diagnostic software and hardware to isolate and localize circuit faults and to report said circuit faults to an operator.

20. The ANP according to claim 1, wherein each of said plurality of said LDU's includes a 68B09 type microcomputer.

21. The ANP according to claim 1, further comprising a plurality of line director units with direct memory access (LDU/D), said LDU/D's serving to transfer data from one of said LDU/D's to another at faster data rates.

22. The ANP according to claim 5, further comprising a mother board, and wherein;
   (a) said mother board includes a front face and a back face, said front face and said back face being provided with connectors for receiving circuit boards; and
   (b) wherein said NDU and said plurality of LDU's are inserted at said front face of said mother board and are interconnected to traces included therein while said plurality of ULT's are inserted at said back face at a connector position opposite to said ULT's respective LDU, said ULT being connected through dedicated pins of said oppositely positioned connector directed to said respective LDU.

23. The ANP according to claim 22, further comprising a card cage, said mother board being mounted centrally at said card cage so that said front face and said back face are accessible for inserting said circuit boards therein.

* * * * *